United States Patent [19]

Kostka

[11] 3,984,210

[45] Oct. 5, 1976

[54] CATALYST FOR THE CONVERSION OF HYDROCARBONS AND A METHOD OF GENERATING A FUEL GAS USING THE CATALYST

[75] Inventor: Hana Kostka, Nurnberg-Grossgrundlach, Germany

[73] Assignee: Siemens Aktiengesellschaft, Munich, Germany

[22] Filed: June 9, 1975

[21] Appl. No.: 585,398

[30] Foreign Application Priority Data
June 28, 1974  Germany............................ 2431168

[52] U.S. Cl................................. 48/212; 252/465; 252/466 J
[51] Int. Cl.²...................... C01B 2/16; B01J 21/04; B01J 23/84
[58] Field of Search........................ 252/465; 48/212

[56] References Cited
UNITED STATES PATENTS
2,668,101   2/1954   Arnold et al..................... 48/212 X

*Primary Examiner*—W. J. Shine
*Attorney, Agent, or Firm*—Kenyon & Kenyon Reilly Carr & Chapin

[57] ABSTRACT

A catalyst for converting hydrocarbons, particularly high hydrocarbons mixed with a gas containing oxygen into gas mixtures containing carbon monoxide and hydrogen in which iron, chromium and at least one of the metals molybdenum and tungsten are applied as an active metal component to a catalyst carrier made of $\gamma$-$Al_2O_3$, $\eta$-$Al_2O_3$ and/or $\delta$-$Al_2O_3$.

12 Claims, No Drawings

CATALYST FOR THE CONVERSION OF HYDROCARBONS AND A METHOD OF GENERATING A FEUL GAS USING THE CATALYST

BACKGROUND OF THE INVENTION

The invention relates to catalysts in general and more particularly to a catalyst for converting hydrocarbons, particularly higher hydrocarbons, mixed with a gas containing oxygen into gas mixtures containing carbon monoxide and hydrogen.

U.S. Pat. application Ser. No. 336,062 filed Feb. 26, 1973, now U.S. Pat. No. 3,926,850, teaches using a catalyst which contains at least one of the substances $\gamma$-aluminum oxide and $\eta$-aluminum oxide along with kaolinite and at least one of the transition metals of the periodic system of the elements as an active component for converting higher hydrocarbons into gas mixtures containing carbon monoxide, hydrogen, methane and carbon dioxide. Along with the hydrocarbons a gas containing oxygen is used, i.e., gas with oxygen in free or bound form. For converting hydrocarbons, particularly higher hydrocarbons, mixed with a gas containing oxygen into gas mixtures containing hydrogen and carbon monoxide, a catalyst which is prepared from a carrier material consisting of aluminum oxide and at least one thermally decomposable and/or reducible compound of one or more of the metals of the sixth secondary group of the periodic system of the elements applied to the carrier material or mixed therewith by annealing and activation through a heat treatment in a reducing atmosphere has also been proposed. In such a process the metal compound is converted, by the annealing and the heat treatment in a reducing atmosphere, into an active component consisting of metal and metal oxide. The carrier material consisting of $\gamma$-$Al_2O_3$ and/or $\eta$-$Al_2O_3$ as well as $\delta$-$Al_2O_3$ is prepared by the annealing of $\gamma$-$Al_2O_3$ or $\eta$-$Al_2O_3$ or a mixture of $\gamma$-$Al_2O_3$ and $\eta$-$Al_2O_3$ and has an alkali content of less than 0.2% by weight and a pore volume of at least 0.5 $cm^3/g$.

SUMMARY OF THE INVENTION

It is an object of the present invention to provide a catalyst of the kind mentioned at the outset with improved properties. In particular, the present invention provides a catalyst which suppresses soot formation to a very large extent even at very low $\lambda$-values as well as permitting heavy loading and, at the same time, a high conversion rate. In addition, the catalyst of the present invention also catalyzes endothermic reactions to a major extent.

According to the present invention, this is achieved by preparing the catalyst by applying compounds of the metals iron and chromium, along with at least one of the metals molybdenum and tungsten, to an aluminum oxide hydrate mixture of 80 to 90% by weight of Boehmite and 10 to 20% by weight of Bayerite or 10 to 20% by weight of at least one of the compounds hydrargillite and Nordstrandite. Alternatively these compounds are applied to a carrier material which is obtained from the aluminum oxide hydrate by annealing at 600° to 830°C and consists of 70 to 80% by weight of $\gamma$-and/or $\eta$-$Al_2O_3$ and 20 to 30% by weight $\delta$-$Al_2O_3$. A subsequent heat treatment is carried out, at least partially in a reducing atmosphere. In the finished catalyst the mass contents of the active metal component are 0.3 to 2.5% by weight iron, 0.3 to 2.5% by weight chromium and 1 to 6% by weight of at least one of the metals molybdenum and tungsten, always referred to the total weight of the catalyst.

Higher hydrocarbons are understood to be hydrocarbons with about 5 to 10 carbon atoms per molecule.

Oxygen-containing gases, which are also designated as oxygen carriers, are understood to be gases such as air and pure oxygen as well as gases which contain compounds in which oxygen is present in bound form, particularly water or water vapor and carbon dioxide. Examples of such gases are the exhaust gases of internal combustion engines or of domestic and industrial burners as well as gases containing $CO_2$ produced in the chemical industry by various processes, e.g., blast-furnace gases. Gases that also contain oxygen in bound form are, for instance, alcohols or their vapors.

Boehmite, Bayerite, hydrar-gillite and Nordstrandite designate different modifications of aluminum oxide hydrates. Nordstrandite is also called randomite. Boehmite AlO(OH) (or $Al_2O_3 \cdot H_2O$) and hydrar-gillite (or Gibbsite) Al(OH)$_3$ become $\eta$-$Al_2O_3$ in the thermal decomposition. From Nordstrandite and Bayerite Al(OH)$_3$ (or $Al_2O_3 \cdot 3H_2O$) $\gamma$-$Al_2O_3$ is obtained through thermal decomposition. Depending on the temperature conditions, however, $\delta$-$Al_2O_3$ can also be formed in the decomposition of Bayerite.

The catalyst according to the present invention is distinguished first by the fact that in the predominant range where, according to the equilibrium calculations of Boudouard, soot should be formed it can be used without the occurrence of noticeable, disturbing soot formation in the cracking reaction that takes place at the catalyst. Second, the catalyst according to the invention also has a longer service life and extremely high conversion rate, i.e., a high degree of reforming in the conversion of the hydrocarbons. Even with very high loads the conversion rate is far above 90 percent, as will be described below. Beyond this, the gas composition remains approximately constant even for high loads. The catalyst according to the present invention has the further advantage that it also catalyzes endothermic reactions to a considerable extent. This means that for the conversion of the hydrocarbons oxygen in bound form can also be used to a large extent, e.g., oxygen in the form of carbon dioxide and water can be used. This ability of the catalyst permits water vapor, which is formed through complete combustion of the hydrocarbons, to be immediately reconverted into hydrogen in the presence of other hydrocarbons.

The gas mixture formed through the reaction at the catalyst, i.e., what is referred to as reformed gas, contains considerable quantities of hydrogen and carbon monoxide along with carbon dioxide. If higher hydrocarbons are used, lower hydrocarbons with two to five C-atoms, particularly in the form of alkenes, as methane, are also formed. If air, for instance, is used as the gas containing oxygen, then the reformed gas also contains nitrogen.

Gas mixtures that can be produced by means of the catalyst according to the present invention are suitable, because of their $H_2$ and CO content, as the starting substances for chemical syntheses, e.g., for oxosynthesis or production of aldehydes through reaction of an $H_2$—CO mixture with olefins in the presence of a catalyst. Furthermore, the gas mixtures containing $H_2$ and CO can also be used as reduction gas, particularly for the direct reduction of iron (Midland-Ross process or the Midrex Process).

The reformed gas which can be produced by means of the catalyst according to the present invention using higher hydrocarbons and which also contains methane and thus constitutes a combustible gas mixture, is also suitable for the operation of domestic and industrial burners and, in particular, for the operation of internal combustion engines, particularly internal combustion engines in motor vehicles. The advantage in these applications is that only small amounts of harmful substances are present in the exhaust gas. Devices called reformed-gas generators for the operation of internal combustion engines are disclosed, for instance, in U.S. Pat. No. 3,828,736 and application Ser. No. 440,223, filed Feb. 6, 1974, now U.S. Pat. No. 3,915,125. The catalyst according to the present invention can be employed in these devices.

The conversion of the hydrocarbons, e.g., gasoline, generally takes place at normal pressure, i.e., atmospheric pressure. However, the conversion can also take place at reduced pressure if the reformed gas produced is to be burned, together with secondary air, in an attached internal-combustion engine. It can also take place at elevated pressure if the mixture produced is to be employed, for instance, in a chemical synthesis that takes place under overpressure (hydroformylization, among others).

DETAILED DESCRIPTION OF THE PREFERRED EMBODIMENT

The catalyst according to the present invention contains the aluminum oxide in the $\gamma$-and/or $\eta$-modification as well as in the $\delta$-modification. $\gamma$-$Al_2O_3$ contains a relatively large number of dislocations and is therefore already active itself. Admixture of $\eta$-$Al_2O_3$, whose lattice likewise has fault locations and which itself is an acitive, catalytically effective carrier, increases the activity of the catalyst considerably. $\gamma$-$Al_2O_3$ and $\eta$-$Al_2O_3$ are not stable at higher temperatures, however, and are transformed irreversably into $\alpha$-$Al_2O_3$, which has little catalytic activity. $\delta$-$Al_2O_3$, which is more stable than $\gamma$-and $\eta$-$Al_2O_3$ at higher temperatures and is likewise active due to its lattice dislocations, presumably causes the transition of the two other phases into $\alpha$-$Al_2O_3$ to slow down. In this manner, the life of the catalyst can be increased considerably.

However, the beneficial effects of the catalyst according to the invention are based not only on the specific composition of the carrier material, but in part also on an interaction between the active metal component and the carrier material. It has been found that the active component slows down to an extraordinary degree the transition of the $\gamma$-, $\eta$- and $\delta$-$Al_2O_3$ modification into $\alpha$-$Al_2O_3$, which is undesirable because of its smaller specific surface and the, for the present purpose, lower activity. Thus in addition to its catalytic activity the active component also exerts a stabilizing influence on the carrier material.

Particularly good results are obtained, particularly with respect to long life and high catalytic activity, if the catalyst according to the present invention contains $\gamma$-$Al_2O_3$ and $\eta$-$Al_2O_3$ in addition to $\delta$-$Al_2O_3$, and the weight ratio of $\gamma$-$Al_2O_3$ to $\eta$-$Al_2O_3$ is between about 9:1 and 1:1. The carrier material advantageously will have a specific surface of more than 15 m$^2$/g and a pore volume of more than 0.2 ml/g.

As noted above, the presence of the $\gamma$-$Al_2O_3$ and/or the $\eta$-$Al_2O_3$ as well as the $\eta$-modification of the aluminum oxide is essential for the method according to the invention. These modifications are produced at elevated temperature from aluminum oxide hydrates which are used as the starting substances. The development of the aluminum oxides can be followed, for instance, by mean of X-rays. The conversion of the aluminum oxide hydrates into the aluminum oxides takes place preferably by annealing at 600° to 830°C, i.e., by heating in the presence of air. The metal compounds are applied to the carrier material prepared in this manner by one or more impregnations. Drying at about 80° to 150°C follows and subsequently, the metal compounds are converted into the active metal component by a heat treatment in a reducing atmosphere at 500° to 750°C. This method of production, in which the finished carrier is impregnated, has the advantage that the formation of $\delta$-$Al_2O_3$, which is produced from $\gamma$-and/or $\eta$-$Al_2O_3$, takes place relatively fast and to a sufficient degree.

The duration of the anneal is advantageously about 4 to 20 hours, with the heating to the annealing temperature preferably taking place only very slowly, i.e., over 2 to 10 hours. The annealing temperature itself is then kept constant for at least 4 hours. During the annealing process, an air stream (about 80 to 200 l/h) can advantageously be conducted through or over the heated material. This causes the conversion of $\gamma$- and $\eta$-$Al_2O_3$ into $\delta$-$Al_2O_3$ to proceed with better yield.

The heat treatment for the reduction of the metal compounds is advantageously performed with a hydronitrogen mixture which preferably has a hydrogen content of about 5 to 20% by volume. The reduction may take place, for instance, directly in the catalytic reactor used for generating the reformed gas, i.e., immediately before the catalyst is used. However, it can also be performed in an electric furnace.

Nitrates such as iron (III) nitrate, and ammonia compounds such as ammonia tungstate, are preferably used as the metal compounds. However, oxides or chlorides, for instance, can also be used.

The catalyst according to the invention can also be produced by applying the metal compounds to the aluminum oxide hydrate mixture, prior to the conversion of the aluminum oxide hydrates into the aluminum oxides. The conversion of the aluminum oxide hydrates into the aluminum oxides, i.e., the carrier material itself, can then take place together with the conversion of the metal compounds into the active metal component. To accomplish this a heat treatment by heating to 600° to 830°C is performed exclusively in a reducing atmosphere; thus, no heating in air, i.e., an annealing process in the proper sense, takes place. However, it is also possible to proceed by first annealing at 500° to 700°C and subsequently heating in a reducing atmosphere to 500° or 750°C. This last variant of the method can also be used successfully when the carrier is finished before the metal salts are applied. Through the annealing process at 500° to 700°C decomposition of the metal compounds then takes place before the reduction itself, ammonia, for instance (from ammonia compounds) and nitrous gases (from nitrates) being removed. If molybdenum is used, the upper temperature limit for the annealing process in an oxidizing atmosphere after impregnating is advantageously about 650°C.

Applying the metal compounds before the carrier is finished, i.e., prior to the annealing process, is advisable if the catalyst is to be given a definite spatial shape, e.g., if it is to be made into perforated-block slabs. In all cases the metal compounds are advantageously applied by impregnation, i.e., by saturation with aqueous solutions of the metal compounds. However, the metal compounds can also be mixed with the starting materials or with the finished carrier material or deposited thereon from the gaseous phase. If the impregnation is accomplished in several steps an annealing process can advantageously be performed between the individual impregnation steps. In the preparation of the catalyst according to the invention, it is also possible to apply only one or two of the metal compounds used to different parts of the annealed carrier material and then mix these components to form the finished catalyst.

The annealed carrier material can advantageously be treated with diluted acid before or after the impregnating. The acid treatment raises what is known as the acid grade of the catalyst, i.e., acid regions (in the sense of Broensted and Lewis) are also created on its surface. The existence of such acid regions further increases the activity of the catalyst. For the acid treatment hydrofluoric acid, preferably as an aqueous 3- to 7-% solution, nitric acid and hydrochloric acid, preferably always in the form of an aqueous 7- to 12-% solution are well suited. However, chromic acid may also be used. If the acid treatment takes place before the impregnation care must be taken that no solution with an alkaline reaction is used for the impregnation.

The aluminum oxide hydrates are advantageously prepared by decomposition of aluminum acetate with ammonia. For this purpose ammonia can be added to neutral or basic aluminum acetate to precipitate aluminum hydroxide. However, the aluminum hydroxide can also be precipitated with ammonia from a solution of aluminum nitrate, working advantageously at a pH-value of about 8 to 10. About 10-% $NH_3$ is added to an aqueous solution of 2 to 20% by weight of aluminum nitrate. The precipitate obtained thereby is separated and dried. It is particularly advantageous to use aluminum alcoholate, preferably isopropylate or amylate, which is hydrolized for the preparation of the aluminum oxide hydrates. The hydrolysis can be performed at room temperature or at slightly elevated temperature. Acetic acid or ammonia can be added to the water. With these known processes depending on the conditions of precipitation and the subsequent drying processes, the different modifications of the aluminum oxide hydrate are obtained in well known manner (cf., for instance, H. Remy, "Lehrbuch der Anorganischen Chemie," Vol. I, 10th edition (1960), pages 421 to 424. The aluminum oxide hydrates are then further processed in the quantitative ratios given, to form the carrier material.

The invention will be explained in further detail with the aid of the following examples.

EXAMPLE 1

815 g of an aqueous ammonia solution with a content of 25% by weight $NH_3$ was diluted with 883 ml of distilled water and 747 g of molybdic acid in powder form dissolved in this solution. 360 ml of the clear solution obtained in this manner was brought to a volume of 1070 ml with distilled water. With this solution, 1335 g of a catalyst carrier of about 60% by weight $\gamma$-$Al_2O_3$, 10% by weight of $\eta$-$Al_2O_3$ and 30% by weight of $\delta$-$Al_2O_3$ with a specific surface of 203 $m^2$/h, formed into pellets and annealed at 700°C, was impregnated (duration: 1 hour). During the impregnating process, the material was stirred at intervals.

Subsequently, the excess impregnating solution was drawn off and the catalyst carrier is dried at about 120°C. After drying, a second impregnation followed. To prepare the impregnating solution, 225 g of crystalline iron (III) nitrate and 65 g of chromium (IV) oxide were dissolved, while being heated and stirred intensively, with sufficient distilled water that 2300 g of a clear, dark-red solution was obtained. With this solution, the pre-impregnated and dried catalyst carrier was impregnated for 40 minutes while being stirred. It has been found advisable to perform this second impregnation at reduced pressure in a partially evacuated vessel. After the second impregnating operation was completed, the excess impregnating solution was drawn off and the catalyst carrier was again dried at about 120°C (duration: about 10 hours). Subsequently, the dried catalyst carrier was annealed at about 600°C in a stream of air (80 to 120 of air per hour). Before use, e.g., for the generation of reformed gas, the metal compounds were reduced to the active metal component by slowly heating them to about 750°C in a hydrogen-nitrogen atmosphere with a content of 20 % by volume of hydrogen. The catalyst prepared in this manner contained 1.7 % by weight or iron, 1.6 % by weight of chromium and 3.7 % by weight of molybdenum.

EXAMPLE 2

815 g of an aqueous ammonia solution with an $NH_3$ content of 25% by weight was diluted with 883 ml of distilled water and 747 g of molybdic acid in powder form dissolved in this solution. 575 ml of the clear solution obtained in this manner was brought to a volume of 1070 ml with distilled water. With this solution, 1335 g of a catalyst carrier of about 80% by weight $\gamma$-$Al_2O_3$ and 20% by weight of $\delta$-$Al_2O_3$ with a specific surface of 195 $m^2$/g, formed into pellets and annealed at about 600°C, were impregnated (duration: 1 hour).

During the impregnation, the material was stirred at intervals; subsequently, the excess impregnating solution was drawn off and the catalyst carrier dried at about 120°C. The drying process was followed by a second impregnation. For this purpose, 405 g of crystalline iron (III) nitrate and 100 g chromium (VI) oxide were dissolved, while being heated and stirred intensively, in sufficient distilled water that 2300 g of a clear, dark-red solution was obtained. With this solution, the preimpregnated and dried catalyst carrier was impregnated as in Example 1 and further processed in the manner described therein. After the annealing process and the reduction, a catalyst was obtained whose active metal component consisted of 2.5% by weight or iron, 2.5% by weight of chromium and 5.9% by weight of molybdenum, always referred to the total weight of the catalyst.

EXAMPLE 3

815 g of an aqueous ammonia solution with an $NH_3$ content of 25% by weight was diluted with 883 ml of distilled water and 200 g of molybdic acid in powder form dissolved in this solution. 360 ml of the clear solution thus obtained was brought to a volume of 1070 ml with distilled water. With this solution, 1335 g of a catalyst carrier of about 40% by weight $\gamma$-$Al_2O_3$, 30% by weight $\eta$-$Al_2O_3$ and 30% by weight $\delta$-$Al_2O_3$ with a specific surface of 218 m²/g, formed into pellets and annealed at 830°C was impregnated (duration: 1 hour). During the impregnation, the material was stirred at intervals; subsequently, the excess impregnating solution was drawn off and the impregnated catalyst carrier dried at about 120°C. The drying process was followed by a second impregnation. To prepare the impregnating solution, 55 g of crystalline iron (III) nitrate and 13 g of chromium (VI) oxide were dissolved, while being heated and stirred intensively, in sufficient distilled water that 2300 g of a clear, dark-red solution was obtained. With this solution, the pre-impregnated and dried catalyst carrier was impregnated in the manner described in Example 1 and processed further. The catalyst obtained after annealing and reduction contained 0.3% by weight of iron, 0.3% by weight of chromium and 1.0% by weight of molybdenum.

EXAMPLE 4

1630 g of an aqueous ammonia solution with an NH₃ content of 25% by weight was diluted with 1765 ml of distilled water and 1495 g of molybdic acid in powder form dissolved in the solution so obtained. With 1170 ml of the clear solution obtained in this manner, 1335 g of a catalyst carrier of about 50% by weight of $\gamma$-$Al_2O_3$, 30% by weight $\eta$-$Al_2O_3$ and 20% by weight $\delta$-$Al_2O_3$ with a specific surface of 184 m²/g, extrusion-molded and annealed at about 750°C, was impregnated (duration: 1 hour). During the impregnating, the material was stirred at intervals; subsequently, the excess impregnating solution was drawn off and the catalyst carrier dried at about 120°C. Thereupon, an anneal was performed at about 550°C in an air stream (about 100 l of air per hour). Another 1335 g of the catalyst carrier described above was impregnated with an impregnating solution prepared in the following manner. 550 g of crystalline iron (III) nitrate and 130 g of chromium (VI) oxide were dissolved, while being heated and stirred intensively, in sufficient distilled water that 2300 g of a clear, dark-red solution was obtained. With this solution, the catalyst carrier was impregnated as in Example 1. Subsequently, a drying operation was performed at about 120°C and an anneal at about 700°C in an air stream (about 100 l of air per hour). Equal volumes of the two impregnated and annealed catalyst carriers were mixed and the metal compounds subsequently reduced by slow heating to about 750°C in a stream of the reducing gas mentioned in Example 1, to form the active metal component. The catalyst obtained in this manner contained 1.8% by weight of iron, 1.7% by weight of chromium and 6.0% by weight of molybdenum.

EXAMPLE 5

178 g of crystalline iron (III) chloride and 53 g of ammonia bichromate were dissolved, while being heated to 45°C, in sufficient distilled water that 1350 ml of clear solution was obtained. With this solution, 1000 g of a carrier material of about 80% by weight $\eta$-$Al_2O_3$ and 20% by weight $\delta$-$Al_2O_3$ with a specific surface of 279 m²/g, formed into pellets 4 × 4 mm in size and annealed at about 700°C, was impregnated (duration: 1 hour). During the impregnating process, the material was stirred at intervals. The excess impregnating solution was subsequently drawn off and the impregnated catalyst carrier dried at about 120°C. This was followed by a second impregnation with an impregnating solution obtained in the following manner. 200 g of an aqueous ammonia solution with an NH₃ content of 25% by weight was diluted with 2150 ml of distilled water and heated to 55°C. Into this solution, 607 g of ammonium tungstate in powder form was brought while being stirred intensively. After filtering of the undissolved residue, the preimpreganted catalyst carrier prepared in the manner described above was impreganted with 830 ml of the clear solution obtained, while being stirred (duration: 1 hour). Subsequently, the excess solution was drawn off, the catalyst carrier dried at 120°C and thereupon annealed in air at about 700°C. Before use, the metal compounds were reduced to the active metal component by slowly heating them in a stream of a hydrogen-nitrogen reducing gas with a content of 5% by volume of hydrogen to about 750°C. The catalyst obtained in this manner contained 2.5% of iron, 1.6% of chromium and 6.0% of tungsten.

EXAMPLE 6

The aluminum oxide hydrates or their mixtures were prepared in approximately the following manner. 5000 g of aluminum isopropylate with an $Al_2O_3$ content of about 20% by weight was mixed at a temperature of 40°C with 1000 ml of aqueous, 10-% acetic acid while being stirred and the mixture, while being stirred, was kept at this temperature for about 1 to 2 hours. Then the suspension was allowed to settle and the liquid on top separated from the gel-like precipitate of the aluminum oxide hydrate mixture obtained in this manner. The precipitate was brought to the dry state on a filter, made into a paste in 2000 ml of aqueous, 2-% acetic acid and the suspension obtained allowed to stand for 2 hours at room temperature. In this process, aging of the aluminum oxide hydrate mixture occurs. Subsequently, the liquid was separated from the precipitate. The still moist precipitate was processed further in the following manner. By drying at 120°C, a mixture of about 80 90% by weight of Boehmite and 10 to 20% by weight of Bayerite, which was milled and then used for the preparation of the carrier was obtained. The moist precipitate was stored prior to the drying for about 24 to 60 hours in a closed vessel to obtain, after drying at 100° to 150°C, a mixture of about 80 to 90% by weight of Boehmite and 10 to 20% by weight of hydrar-gillite and Nordstrandite.

By changing the reaction conditions, particularly the temperature treatments and their duration, as well as with other concentrations of the aluminum alcoholate and the acetic acid, aluminum oxide hydrate mixtures with different composition can be obtained.

EXAMPLE 7

815 g of an aqueous ammonia solution with an ammonia content of 25% by weight was diluted with 883 ml of distilled water and 200 g of molybdic acid in powder form dissolved in the solution so obtained. 360 ml of the clear solution obtained in this manner was diluted to a volume of 750 ml and thoroughly mixed with 2000 g of an aluminum oxide hydrate of about 80% by weight of Boehmite and 20% by weight of hydrar-gillite and Nordstrandite, which was prepared in accordance with Example 6 and was dried and milled. The excess impregnating solution was drawn off thereupon and the moist mixture dried at 150°C and subsequently milled. This was followed by a second impregnation with an impregnating solution obtained in the following manner. 55 g of crystalline iron (III) nitrate and 13 g of chromium (VI) oxide were dissolved, while being heated and stirred intensively, in sufficient distilled water that 750 of a clear, dark-red solution was obtained. With this solution, the pre-impreganted aluminum oxide hydrate mixture in powder form was impregnated and the excess impregnating solution drawn off. The moist mixture was dried at 150°C and subsequently milled. The powder obtained thereby was mixed with 2% by weight of graphite and formed into pellets in a tabletting press. Subsequently, the aluminum oxide hydrate mixture was converted by slow heating to 800°C in a stream of a reducing gas of 20% by volume of hydrogen and 80% by volume of nitrogen into aluminum oxide and the metal compounds reduced to the metallically active component. The heating to the reaction temperature of 800°C took about 10 hours. The temperature treatment at 800°C also took The formula $C_xH_y$ signifies hydrocarbons of a carbon number from 3 on. The remainder of the gas mixture obtained is nitrogen coming from the air.

EXPERIMENT 1

A catalyst prepared according to Example 1 was used, using a reactor of the kind described above, for reforming (cracking) n-heptane or gasoline (straight-run gasoline with an average overall formula of $C_8H_{16}$ and a boiling range of somewhere between 25° and 200°C) with air (air number between 0.065 and 0.15). The n-heptane or the gasoline was evaporated at about 350°C and converted together with the air at a temperature of 775°C or 800°C respectively. The results obtained therewith are summarized in the following Table 2.

Table 2

| Loading n-heptane | λ | Convs'n % by wt. | Gas Composition in % by Vol. | | | | | Reaction temp °C |
|---|---|---|---|---|---|---|---|---|
| | | | $H_2$ | CO | $CO_2$ | $CH_4$ | $C_2H_6$ | $C_xH_y$ | |
| 17.5 | 0.065 | 92.5 | 12.2 | 11.5 | 3.6 | 9.9 | 1.3 | 19.2 | 775 |
| 17.5 | 0.10 | 93.5 | 7.4 | 11.3 | 4.5 | 5.6 | 1.0 | 14.6 | 775 |
| 17 | 0.10 | 99.0 | 7.7 | 11.4 | 4.8 | 7.3 | 0.9 | 16.7 | 800 |
| 17 | 0.15 | 100 | 4.7 | 10.0 | 5.1 | 6.8 | 0.7 | 12.8 | 800 |
| 23 | 0.10 | 97.4 | 10.6 | 14.9 | 3.3 | 6.7 | 1.0 | 14.5 | 800 |
| 32 | 0.10 | 99.4 | 11.0 | 13.8 | 3.5 | 7.1 | 1.2 | 14.2 | 800 |
| 36 | 0.10 | 99.1 | 12.7 | 15.1 | 3.1 | 6.0 | 0.1 | 13.7 | 800 |
| Gasoline | | | | | | | | | |
| 18 | 0.10 | 93.1 | 9.5 | 13.7 | 4.7 | 7.7 | 0.7 | 9.0 | 800 |
| 18 | 0.15 | 95.0 | 9.2 | 15.9 | 4.7 | 5.1 | 0.5 | 6.2 | 800 | about 10 hours. Through this temperature treatment a carrier material of about 50% by weight γ-$Al_2O_3$, 25% by weight η-$Al_2O_3$ and 25% by weight δ-$Al_2O_3$ was obtained from the aluminum oxide hydrate mixture of the composition given above. The content of active metallic component in the catalyst was 0.6% of iron, 0.5% of chromium and 1.4% of molybdenum.

The catalysts obtained in accordance with the examples above were placed in a reactor with a diameter of 40 to 50 mm, the layer of catalyst in the form of extruded moldings or perforated blocks being about 15 to 20 mm thick. The favorable results which were obtained using such catalysts in accordance with the invention will be shown with the aid of the following experimental results.

CONTROL EXPERIMENT

Using the catalyst described in U.S. application Ser. No. 336,062, n-heptane was cracked at 770°C in the presence of air (air number = 0.077). To this end, the n-heptane was evaporated at about 350°C and conducted over the catalyst in a reactor of the kind described. The catalyst had about the following composition (in % by weight): 55.8% γ-$Al_2O_3$, 16.0% η-$Al_2O_3$, 17.0% kaolinite, 0.3% $TiO_2$, 7.5% $La_2O_3$ and 3.4% CoO. The loading of the catalyst (in liters of n-heptane per liter of catalyst volume and hour), the conversion rate of n-heptane and the composition of the gas mixture obtained are shown in the following Table.

The remainder of the gas mixtures obtained in the conversion is again nitrogen.

As will be seen from a comparison of the results given in Tables 1 and 2, the catalyst according to the present invention has a number of advantages. With the same reaction temperature (e.g., about 770°C), higher loading (17.5 V/V/hr instead of 11.0 V/V/hr) was obtained with the catalyst according to the present invention. Furthermore, the CO content in the gas mixture was raised and, in particular, the CO:$CO_2$ ratio was heavily shifted toward CO (increase from 1.9 to 3.2). It can further be seen from Table 2 that the catalyst according to the present invention permits a very high conversion rate even at very high loading, e.g., up to 36 V/V/hr; the conversion with a reaction temperature of about 800°C was between 93 and 100% by weight. In addition, the gas mixture produced did not change its composition appreciably even for large load variations. It should be particularly noted that in the investigations carried out, the dwelling time at the catalyst was only between 10 and 20 msec. This confirms the extraordinarily high activity of the catalyst according to the present invention. It has further been found that no soot formation takes place even in extended tests.

EXPERIMENT 2

With a catalyst prepared according to Example 4, n-heptane was reformed according to Experiment 1, where in several test runs the air was partially replaced by $CO_2$— and $H_2O$— containing gases, i.e., by engine exhaust gases. The following Table 3 shows the experimental results.

Table 1

| Loading n-heptane | λ | Convs'n % by wt. | Gas Composition in % by Vol. | | | | | Reaction temp. °C |
|---|---|---|---|---|---|---|---|---|
| | | | $H_2$ | CO | $CO_2$ | $CH_4$ | $C_2H_6$ | $C_xH_y$ | |
| 11.0 | 0.07 | 91.6 | 14.5 | 10.5 | 5.6 | 4.9 | 1.0 | 9.8 | 770 |

Table 3

| Load'g n-heptane | λ | $CO_2$+$H_2O$ Vol % | Convs'n % by wt | $H_2$ | \multicolumn{5}{c}{Gas Composition % by Vol} | Reaction temp. °C |
|---|---|---|---|---|---|---|---|---|---|---|
| | | | | | CO | $CO_2$ | $CH_4$ | $C_2H_6$ | $C_rH_y$ | |
| 18 | 0.1 | 0  | 98.7 | 6.9  | 10.2 | 4.4 | 6.5 | 1.0 | 16.5 | 800 |
| 24 | 0.1 | 0  | 96.5 | 8.8  | 11.9 | 4.5 | 5.8 | 1.0 | 14.8 | 800 |
| 32 | 0.1 | 0  | 93.6 | 8.2  | 11.9 | 3.8 | 5.3 | 0.8 | 15.3 | 800 |
| 18 | 0.1 | 25 | 97.5 | 13.3 | 10.8 | 5.8 | 4.3 | 0.8 | 9.7  | 800 |
| 24 | 0.1 | 25 | 96.0 | 12.2 | 10.4 | 6.0 | 3.9 | 0.8 | 10.3 | 800 |
| 32 | 0.1 | 25 | 95.0 | 11.2 | 9.5  | 6.3 | 4.5 | 1.0 | 11.1 | 800 |
| 18 | 0.1 | 50 | 95.4 | 13.7 | 10.8 | 5.4 | 4.5 | 0.8 | 10.9 | 800 |
| 24 | 0.1 | 50 | 94.9 | 12.9 | 9.1  | 5.9 | 4.9 | 0.8 | 12.3 | 800 |
| 32 | 0.1 | 50 | 89.7 | 10.9 | 10.4 | 6.6 | 5.7 | 1.2 | 15.4 | 800 |

It is seen that the catalyst according to the invention operates with a high conversion rate at high loading even if the oxygen required for the conversion of the hydrocarbon is used in bound form, i.e., if the hydrocarbon conversion is endothermic.

EXPERIMENT 3

In the following Table 4, experimental results are listed which were obtained with a catalyst which contained only iron (6.9% by weight) and chromium (6.6% by weight).

Table 4

| Loading n-heptane | λ | Convs'n % by wt. | $H_2$ | CO | $CO_2$ | $CH_4$ | $C_2H_6$ | $C_rH_y$ | Reaction temp °C |
|---|---|---|---|---|---|---|---|---|---|
| 18 | 0.10 | 86.4 | 6.3 | 9.5  | 5.4 | 4.7 | 0.9 | 12.8 | 770 |
| 18 | 0.15 | 90.9 | 3.9 | 7.9  | 6.8 | 2.7 | 0.5 | 7.8  | 770 |
| 18 | 0.10 | 92.8 | 6.0 | 10.3 | 4.5 | 6.3 | 1.0 | 14.7 | 800 |
| 18 | 0.15 | 91.7 | 3.3 | 8.8  | 6.5 | 4.3 | 0.5 | 9.7  | 800 |
| 18 | 0.10 | 98.7 | 9.0 | 10.7 | 3.1 | 8.5 | 0.9 | 16.3 | 830 |
| 24 | 0.10 | 91.1 | 8.1 | 11.2 | 4.2 | 5.3 | 0.8 | 14.1 | 800 |
| Gasoline | | | | | | | | | |
| 18 | 0.10 | 91.1 | 7.9 | 13.2 | 5.0 | 7.4 | 0.8 | 10.0 | 800 |
| 18 | 0.15 | 90.9 | 6.2 | 13.3 | 5.8 | 4.5 | 0.6 | 8.2  | 800 |

As will be seen from a comparison of the results reproduced in Table 4 with the results contained in Table 3, which were obtained using air (i.e., 0% by volume $CO_2$ + $H_2O$) as the oxygen carrier, the lack of molybdenum has an adverse effect on the reforming reaction. The conversion regresses by about 5 to 6% by weight and the $H_2$ concentration in the gas mixture obtained is decreased.

EXPERIMENT 4

The large load-handling capacity of the catalyst according to the present invention was already demonstrated by Experiment 1. Further investigations, however, showed that the loading of the catalyst according to the present invention can be increased still further. These results are shown in the following Table 5.

Table 5

| Loading Gasoline | λ | Convs'n % by wt. | $H_2$ | CO | $CO_2$ | $CH_4$ | $C_2H_6$ | $C_rH_y$ | Reaction temp. °C |
|---|---|---|---|---|---|---|---|---|---|
| 64 | 0.1 | 89.1 | 8.3  | 9.5  | 6.3 | 7.6 | 0.9 | 12.4 | 800 |
| 18 | 0.1 | 93.6 | 10.5 | 12.6 | 5.7 | 6.3 | 0.8 | 9.0  | 800 |

In the experiments given in Table 5, the dwelling time of the reactant of the catalyst was only about 5 to 10 msec, even for a loading of 64 V/V/hr. Even so the conversion rate decreased only by about 5% by weight and there was no appreciable degradation of the gas composition.

In general, the investigations carried out showed that with the use of the catalyst according to the present invention, the conversion rate of the gasoline used, i.e., the hydrocarbons, is very high, even for high loading and short dwelling times. Almost complete conversion takes place at temperatures as low as 750° to 800°C. In addition, the conversions proceed almost without soot.

The catalyst according to the present invention can be used for reforming gaseous hydrocarbons in addition to its use for reforming higher, liquid hydrocarbons such as gasoline. Thus, methane-containing gases, such as marsh gas or natural gas, can also be converted into CO- and $H_2$-containing gas mixtures. These and other modifications may be made without departing from the spirit of the invention which is intended to be limited solely by the appended claims.

What is claimed is:

1. In a catalyst for converting hydrocarbons, particularly higher hydrocarbons mixed with a gas containing oxygen into gas mixtures containing carbon monoxide and hydrogen, which consists of an active metal component consisting of metal or metal oxide obtained by a heat treatment of metal compounds of transition metals of the periodic system of the elements on a carrier material of aluminum oxide which is obtained from aluminum oxide hydrate by heating, the improvement comprising a catalyst prepared by the steps comprising:

a. applying as the active metal component compounds of the metals iron, chromium and at least one of the group of metals consisting of molybdenum and tungsten, said metal compounds being thermally reducible to active metals in a reducing atmosphere on one of the group consisting of an aluminum oxide hydrate mixture consisting of 80 to 90% by weight of Boehmite and 10 to 20% by weight of Bayerite or 10 to 20% by weight of at least one of the compounds hydrar-gillite and Nordstrandite, and a carrier material which is obtained from said aluminum oxide hydrate mixture by annealing at 600° to 830°C and consists of 70 to 80% by weight of at least one of the group consisting of $\gamma$-$Al_2O_3$ and $\eta$-$Al_2O_3$ and 20 to 30% by weight of $\delta$-$Al_2O_3$, and b. subsequently carrying out a heat treatment, at least partially in a reducing atmosphere, to result in a finished catalyst in which the quantitative percentages of the active metals are 0.3 to 2.5% of iron 0.3 to 2.5% of chromium and 1 to 6% by weight of at least one of the metals molybdenum and tungsten, always referred to the total weight of the catalyst.

2. The catalyst according to claim 1, wherein the weight ratio of $\gamma$-$Al_2O_3$ : $\eta$-$Al_2O_3$ is between about 9:1 and 1:1.

3. The method of manufacturing a catalyst for converting hydrocarbons mixed with a gas containing oxygen into gas mixtures containing carbon monoxide and hydrogen comprising:
 a. preparing a carrier material from an aluminum hydroxide mixture consisting of 70–80% by weight of at least one of the group consisting of $\gamma$-$Al_2O_3$ and $\eta$-$Al_2O_3$ and 20–30% by weight of $\delta$-$Al_2O_3$ by annealing at 600°–800°C;
 b. applying to said carrier compounds of the metals iron, chromium and at least one of the group of metals consisting of molybdenum and tungsten, said compounds being compounds which are thermally reduceable to active metals in a reducing atmosphere, in at least one impregnating step;
 c. drying the impregnating carrier at about 80°–150°C;
 d. subsequently converting the metal compounds into active metals through a heat treatment of 500°–750°C in a reducing atmosphere.

4. The method according to claim 3, wherein the annealing is performed for about 4 to 20 hours.

5. The method according to claim 4, wherein the heat treatment is carried out with a hydrogen-nitrogen mixture containing about 5 to 20% by volume of hydrogen.

6. The method according to claim 3, wherein the anealing is performed at 500° to 700°C in air prior to the heat treatment.

7. The method according to claim 3 wherein the annealed carrier material is treated with diluted acid.

8. The method according to claim 7, wherein one of the group consisting of hydrofluoric acid, nitric acid and hydrochloric acid is used for said treatment.

9. The method according to claim 3, wherein said aluminum oxide hydrates are prepared by decomposition of aluminum acetate with ammonia.

10. The method according to claim 3, wherein the aluminum oxide hydrates are prepared by hydrolysis of aluminum alcoholate.

11. A method of generating a fuel gas for an internal combustion engine comprising converting hydrocarbon fuel mixed with air to a reformed gas containing carbon monoxide, hydrogen and methane by passing said mixture of hydrocarbon fuel and gas containing oxygen through a catalyst made by steps comprising:
 a. applying compounds of the metals iron, chromium and at least one of the group of metals consisting of molybdenum and tungsten, said metal compounds being thermally reducible to active metals in a reducing atmosphere, on one of the group consisting of an aluminum oxide hydrate mixture consisting of 80 to 90% by weight of Boehmite and 10 to 20% by weight of Bayerite or 10 to 20% by weight of at least one of the compounds hydrar-gillite and Nordstrandite, and a carrier material which is obtained from said aluminum oxide hydrate mixture by annealing at 600° to 830°C and consists of 70 to 80% by weight of at least one of the group consisting of $\gamma$-$Al_2O_3$ and $\eta$-$Al_2O_3$ and 20 to 30% by weight of $\delta$-$Al_2O_3$, and
 b. subsequently carrying out a heat treatment, at least partially in a reducing atmosphere, to result in a finished catalyst in which the quantitative percentages of the active metals are 0.3 to 2.5% of iron, 0.3 to 2.5% of chromium and 1 to 6% by weight of at least one of the metals molybdenum and tungsten, always referred to the total weight of the catalyst.

12. A method of generating a gas mixture for use in chemical synthesis and as a reduction gas for the production of iron comprising converting a hydrocarbon mixed with a gas containing oxygen to a gas mixture containing carbon monoxide and hydrogen by passing said mixture of hydrogen and gas containing oxygen through a catalyst obtained by steps comprising:
 a. applying compounds of the metals iron, chromium and at least one of the group of metals consisting of molybdenum and tungsten, said metal compounds being thermally reducible to active metals in a reducing atmosphere, on one of the group consisting of an aluminum oxide hydrate mixture consisting of 80 to 90% by weight of Boehmite and 10 to 20% by weight of Bayerite or 10 to 20% by weight of at least one of the compounds hydrar-gillite and Nordstrandite, and a carrier material which is obtained from said aluminum oxide hydrate mixture by annealing at 600° to 830°C and consists of 70 to 80% by weight of at least one of group consisting of $\gamma$-$Al_2O_3$ and $\eta$-$Al_2O_3$ and 20 to 30% by weight of $\delta$-$Al_2O_3$, and
 b. subsequently carrying out a heat treatment, at least partially in a reducing atmosphere, to result in a finished catalyst in which the quantitative percentages of the active metals are 0.3 to 2.5% of iron, 0.3 to 2.5% of chromium and 1 to 6% by weight of at least one of the metals molybdenum and tungsten, always referred to the total weight of the catalyst.

* * * * *

UNITED STATES PATENT AND TRADEMARK OFFICE
CERTIFICATE OF CORRECTION

PATENT NO. : 3984210
DATED : OCTOBER 5, 1976
INVENTOR(S) : HANA KOSTKA

It is certified that error appears in the above-identified patent and that said Letters Patent are hereby corrected as shown below:

Col. 3, line 16: delete "Ser. No. 440 223" and insert therefor --Ser. No. 440 023--;

Col. 6, line 55: delete "or iron" and insert therefor --of iron--;

Col. 11, line 62: delete "of the catalyst" and insert therefor --at the catalyst--;

Col. 14, line 34 (Claim 12): delete "of hydrogen" and insert therefor --of hydrocarbon--.

Signed and Sealed this

Fifteenth Day of March 1977

[SEAL]

Attest:

RUTH C. MASON
Attesting Officer

C. MARSHALL DANN
Commissioner of Patents and Trademarks